(12) United States Patent
Hyun et al.

(10) Patent No.: US 11,513,559 B2
(45) Date of Patent: Nov. 29, 2022

(54) LAPTOP HAVING DUAL MONITORS THAT ARE ARRANGED VERTICALLY

(71) Applicant: BLD CO., LTD., Seoul (KR)

(72) Inventors: Euy Sub Hyun, Seoul (KR); Tae Hoo Jung, Seoul (KR)

(73) Assignee: BLD CO., LTD, Seoul (KR)

( * ) Notice: Subject to any disclaimer, the term of this patent is extended or adjusted under 35 U.S.C. 154(b) by 0 days.

(21) Appl. No.: 17/596,562

(22) PCT Filed: Jun. 12, 2020

(86) PCT No.: PCT/KR2020/007644
§ 371 (c)(1),
(2) Date: Dec. 13, 2021

(87) PCT Pub. No.: WO2020/251300
PCT Pub. Date: Dec. 17, 2020

(65) Prior Publication Data
US 2022/0206535 A1 Jun. 30, 2022

(30) Foreign Application Priority Data

Jun. 14, 2019 (KR) .......................... 10-2019-0070414

(51) Int. Cl.
*G06F 1/16* (2006.01)
*G06F 3/041* (2006.01)
*G06F 3/02* (2006.01)

(52) U.S. Cl.
CPC .......... *G06F 1/1647* (2013.01); *G06F 1/1616* (2013.01); *G06F 1/1681* (2013.01);
(Continued)

(58) Field of Classification Search
CPC .... G06F 1/1647; G06F 1/1616; G06F 1/1681; G06F 3/04164; G06F 3/0213; G06F 3/0412

See application file for complete search history.

(56) References Cited

U.S. PATENT DOCUMENTS

2012/0274565 A1  11/2012  Moser
2015/0103010 A1*  4/2015  Zhang .................... G06F 3/041
345/168
(Continued)

FOREIGN PATENT DOCUMENTS

KR  10-2003-0045717 A  6/2003
KR  10-2014-0063971 A  5/2014
(Continued)

OTHER PUBLICATIONS

International Search Report for PCT/KR2020/007644 dated, Sep. 22, 2020 (PCT/ISA/210).
(Continued)

*Primary Examiner* — Peter D McLoone
(74) *Attorney, Agent, or Firm* — Sughrue Mion, PLLC

(57) ABSTRACT

Disclosed is a laptop having dual monitors that are arranged vertically, the laptop comprising: a main monitor 210 having a vertical width of a first size; a body 220 having, on one side thereof, a first hinge unit 221 formed so as to fold the main monitor 210, and a keyboard 222 spaced from the first hinge unit 221 so as to be arranged on the lower end of an upper plate; and a folder-type sub monitor 230 which has a vertical width of a second size that is relatively smaller than the vertical width of the first size, and which is adjacent to the keyboard 222 so as to ascend at a certain inclined angle on the basis of a second hinge unit 231 formed on the upper end of the upper plate of the body 220, and thus the present invention divides a screen so that different UIs may be respectively provided through the main monitor 210 and the sub monitor 230.

8 Claims, 21 Drawing Sheets

(52) U.S. Cl.
CPC .......... *G06F 3/0213* (2013.01); *G06F 3/0412* (2013.01); *G06F 3/04164* (2019.05)

(56) References Cited

U.S. PATENT DOCUMENTS

2018/0210504 A1 7/2018 Moser
2021/0318725 A1* 10/2021 Lin ...................... G06F 1/1686

FOREIGN PATENT DOCUMENTS

| KR | 10-1440315 B1 | 10/2014 |
| KR | 10-1796683 B1 | 11/2017 |
| KR | 10-2018-0126965 A | 11/2018 |

OTHER PUBLICATIONS

Korean Grant of Patent for 10-2019-0070414 dated Jan. 21, 2021.
Korean Notification of Reason for Refusal for 10-2019-0070414 dated, Jul. 18, 2020.

* cited by examiner

[Fig. 1]
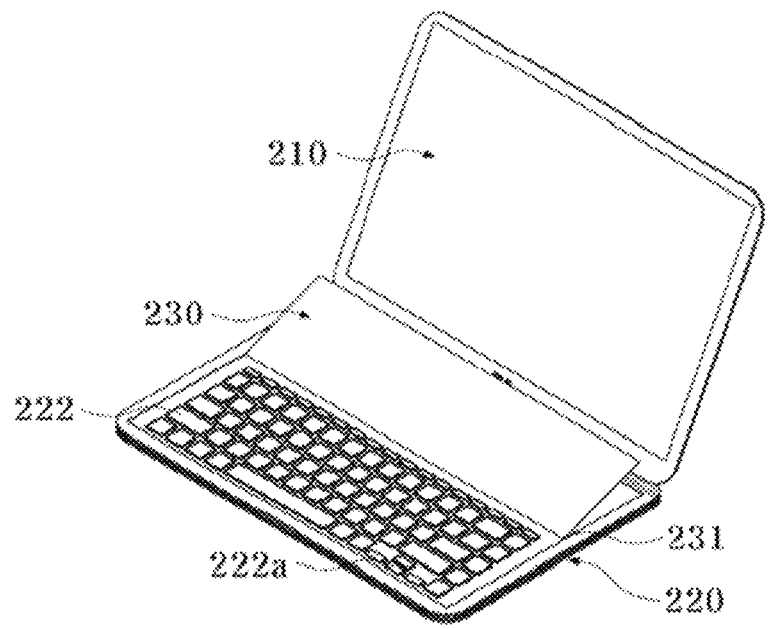
(a)
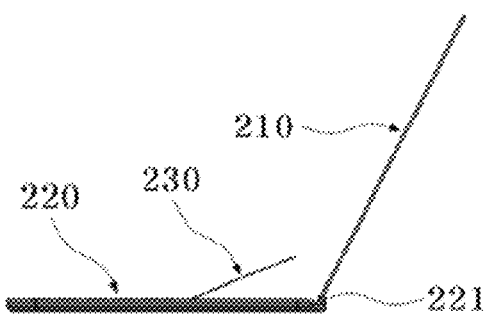
(b)

FIG. 2
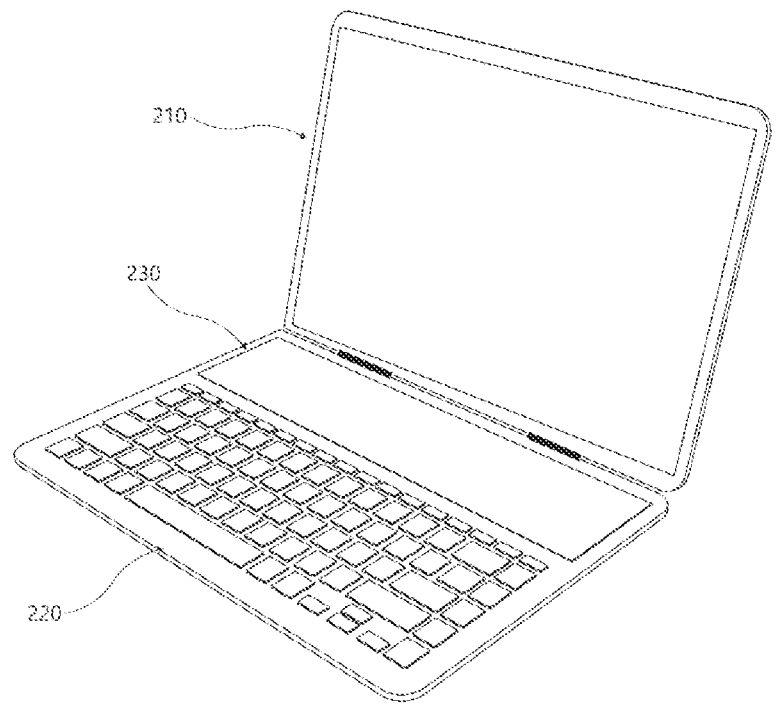
(a)
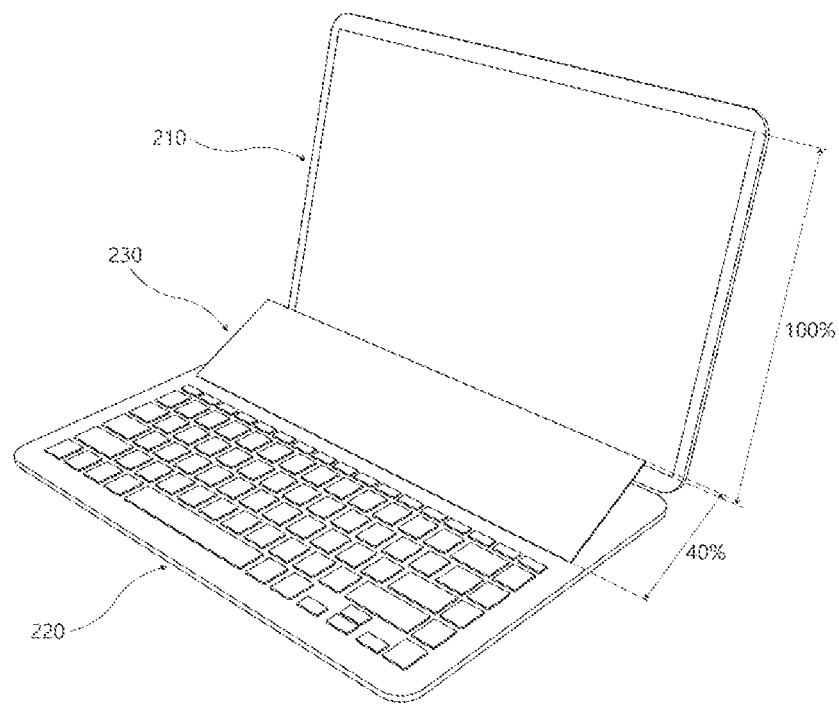
(b)

FIG. 3
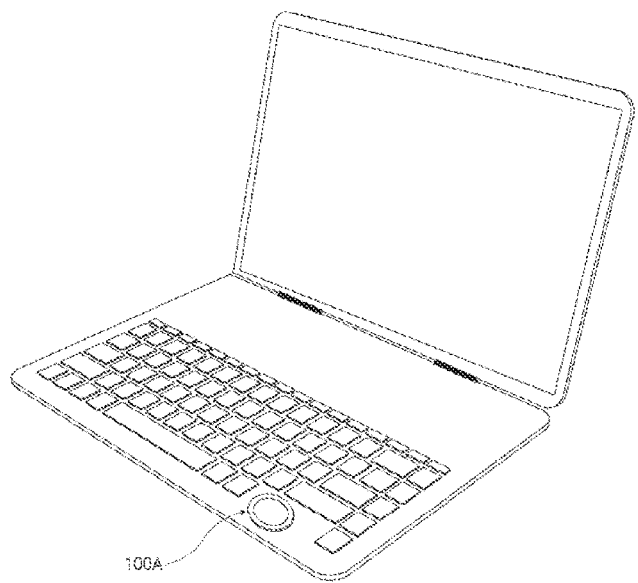
(a)
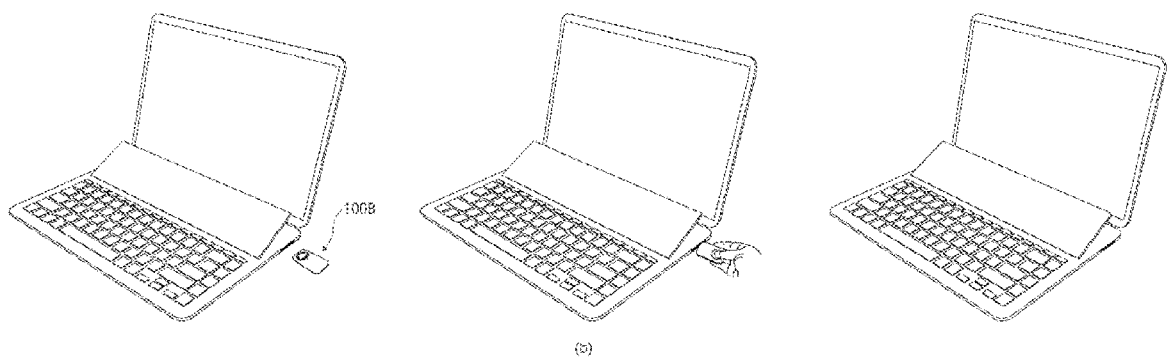
(b)

Before ascending sub monitor   After ascending sub monitor

FIG. 9
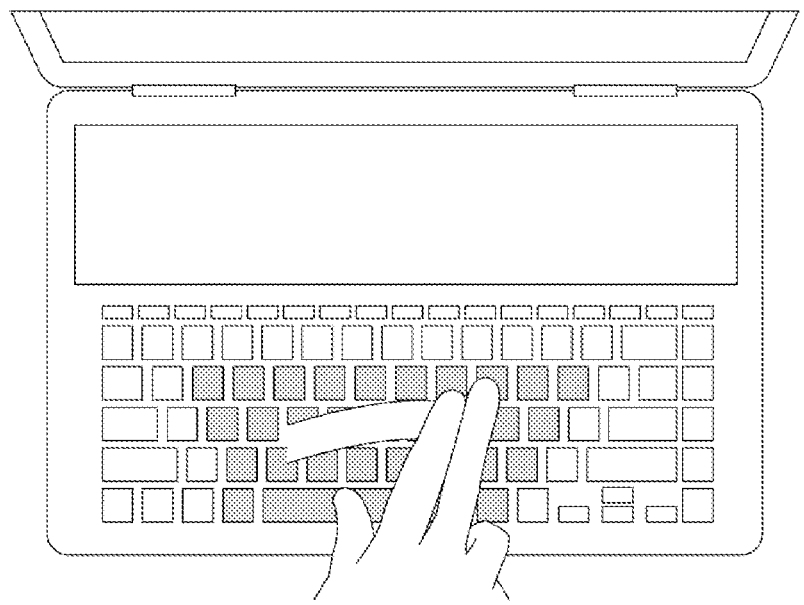
(a)
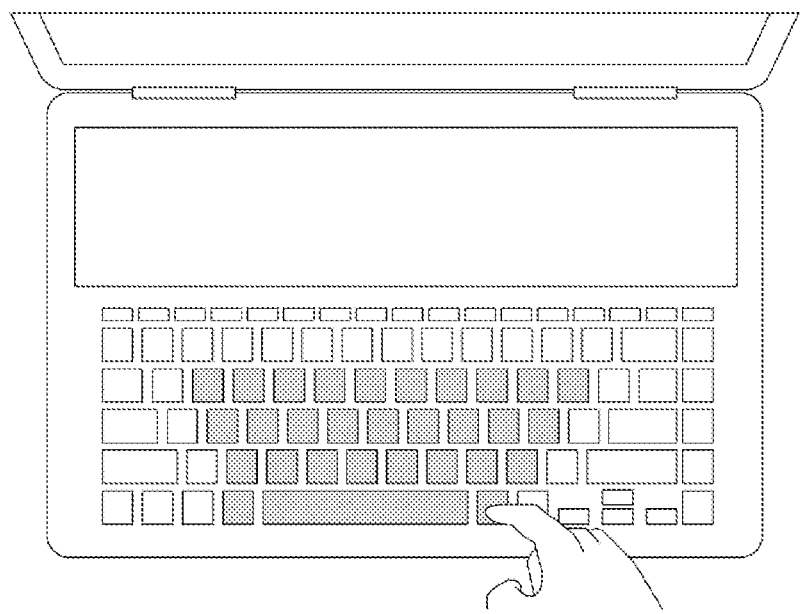
(b)

[Fig. 10A]
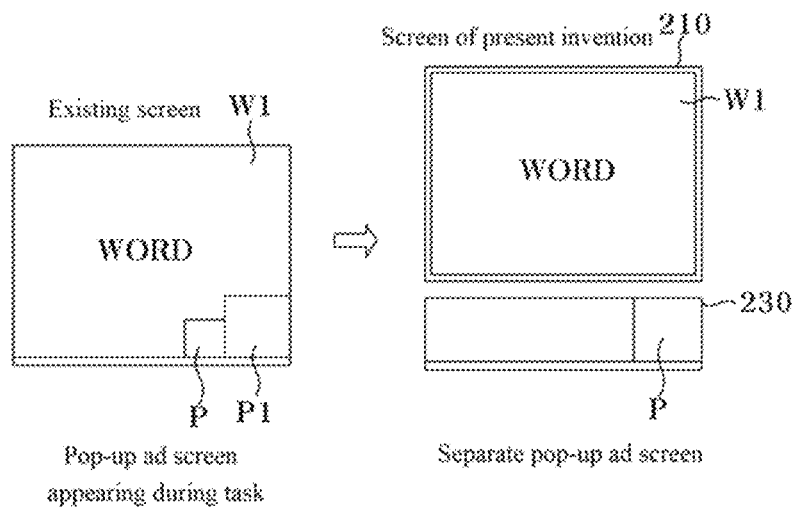
[Fig. 10B]
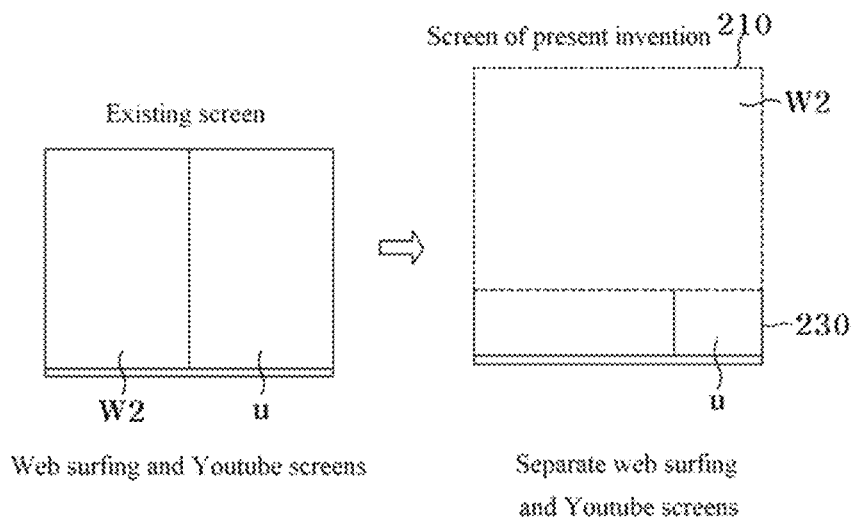

[Fig. 10C]
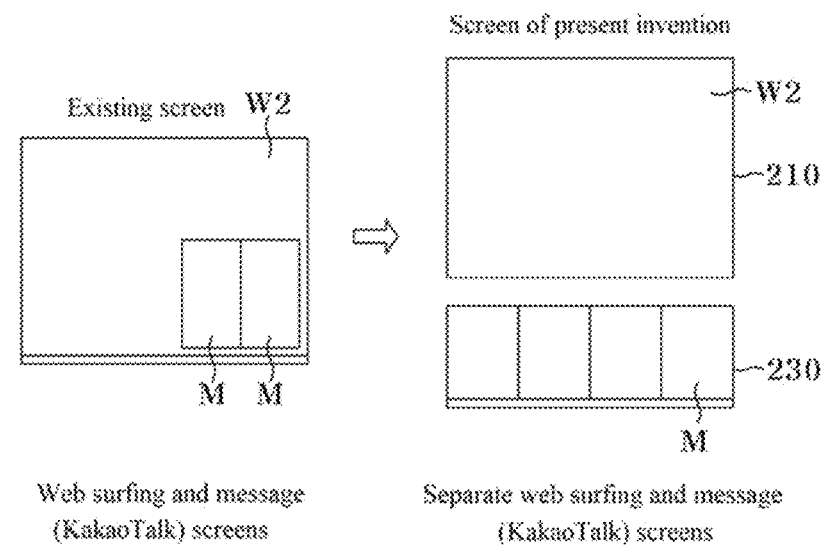
[Fig. 11A]
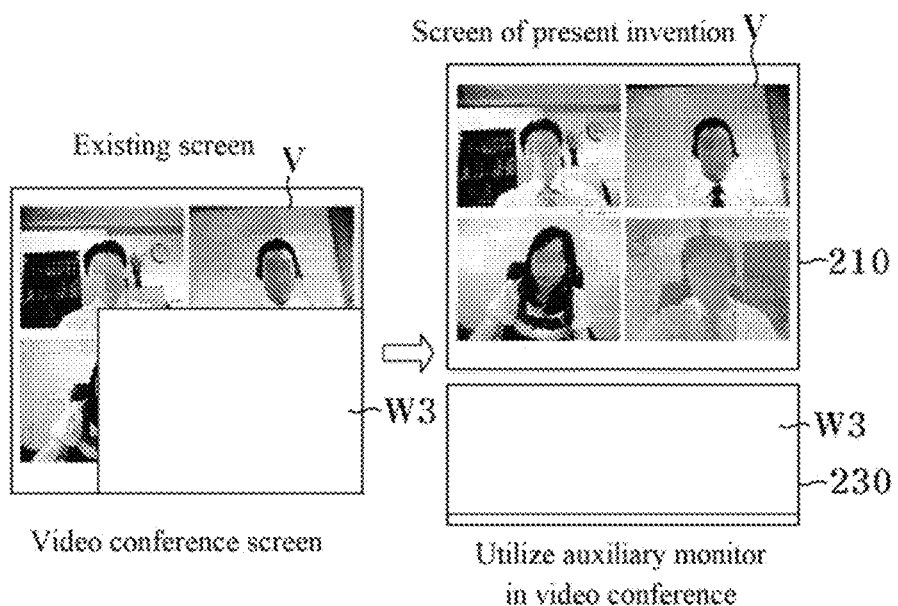

[Fig. 11B]
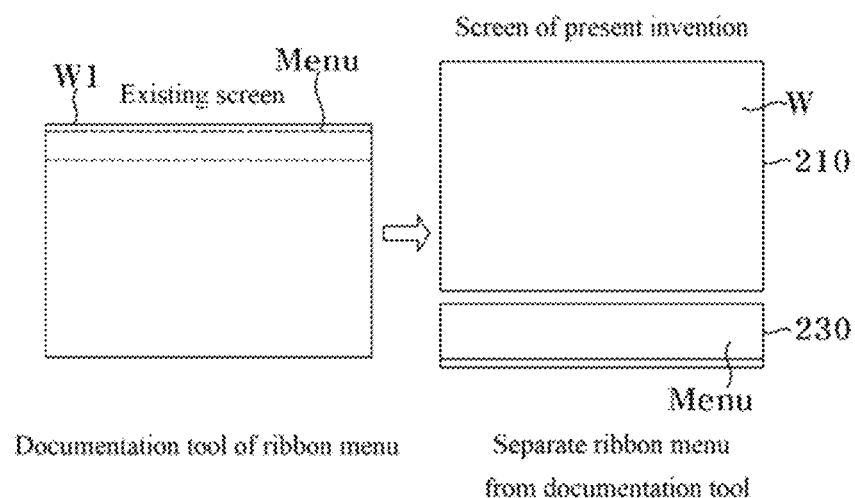
[Fig. 12A]
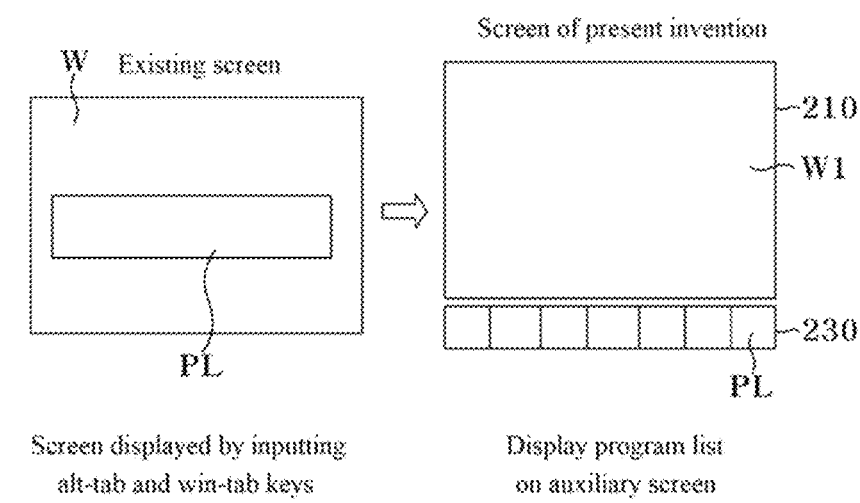

[Fig. 12B]
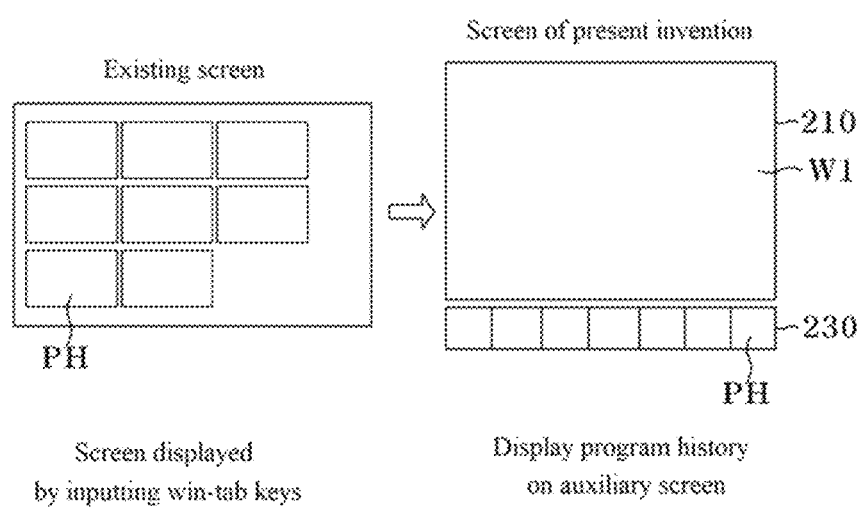

[Fig. 13A]
Existing screen
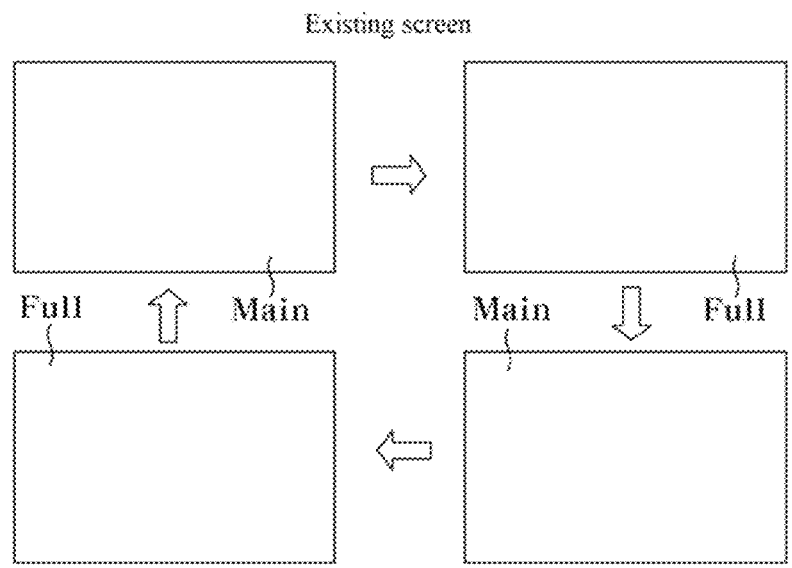
Select video other than Youtube full screen mode
Screen of present invention
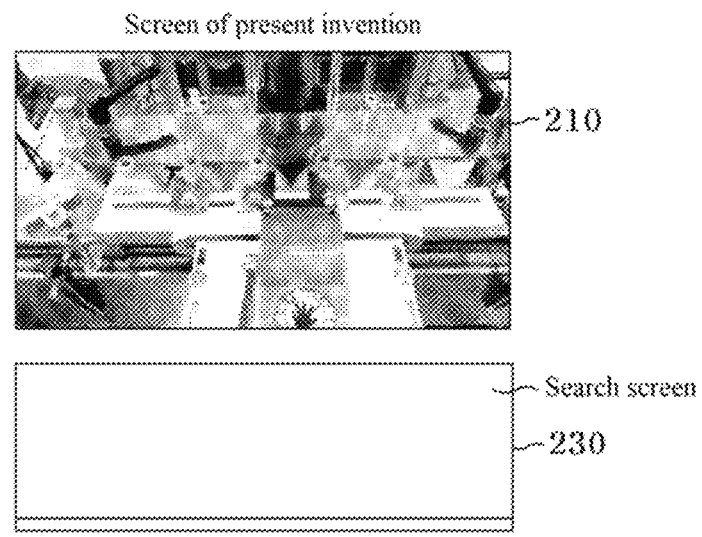
Separate Youtube full screen mode play screen and search screen

[Fig. 13B]
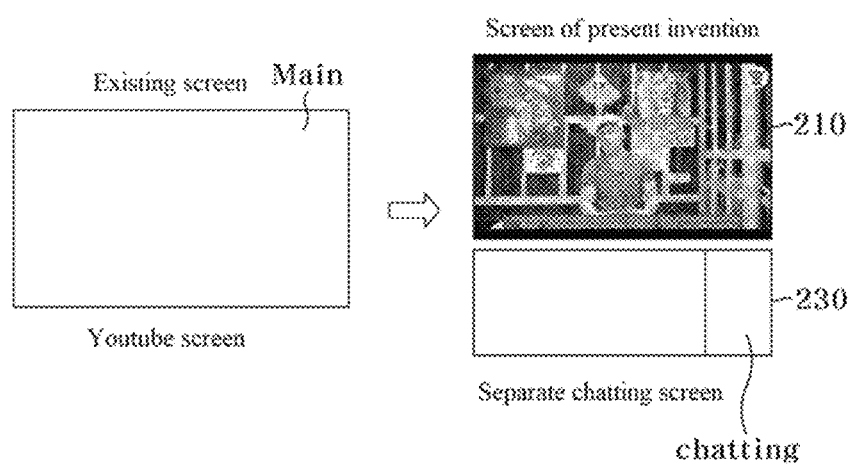

[Fig. 14]
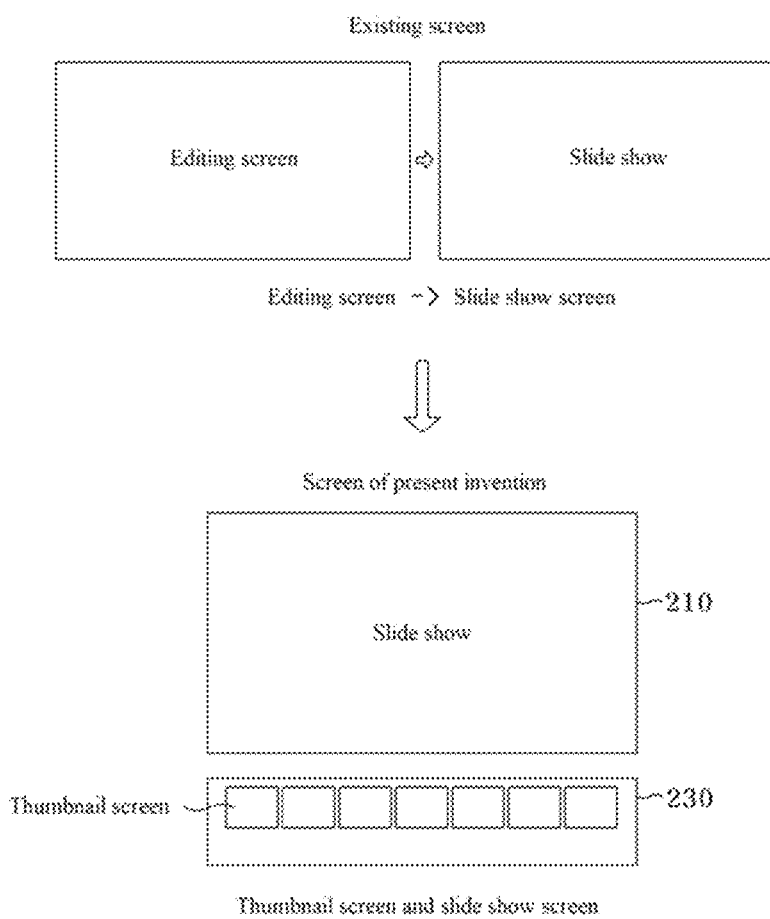

FIG. 18
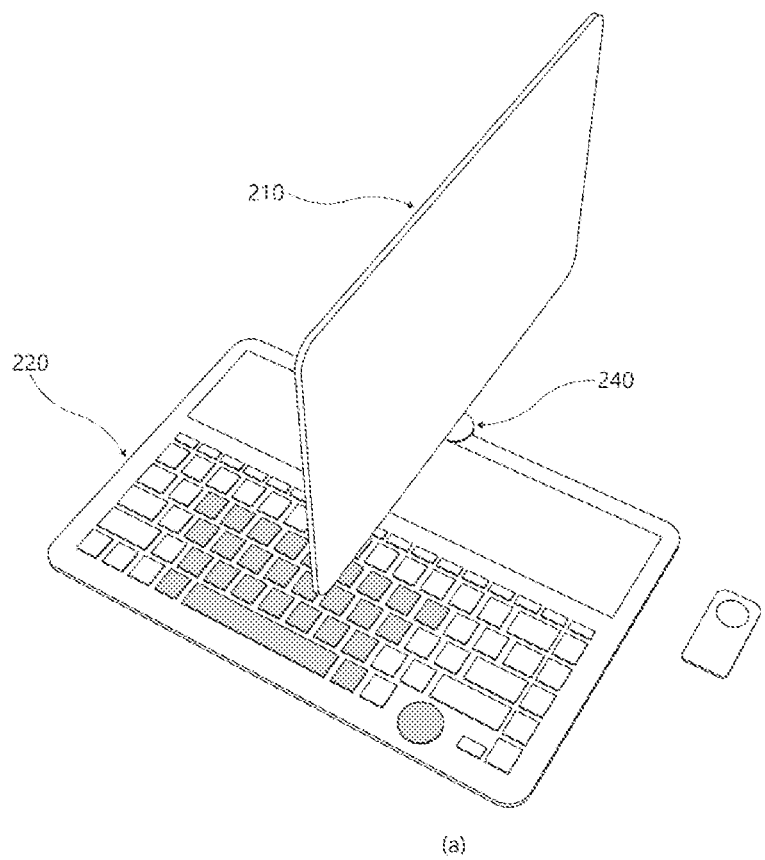
(a)
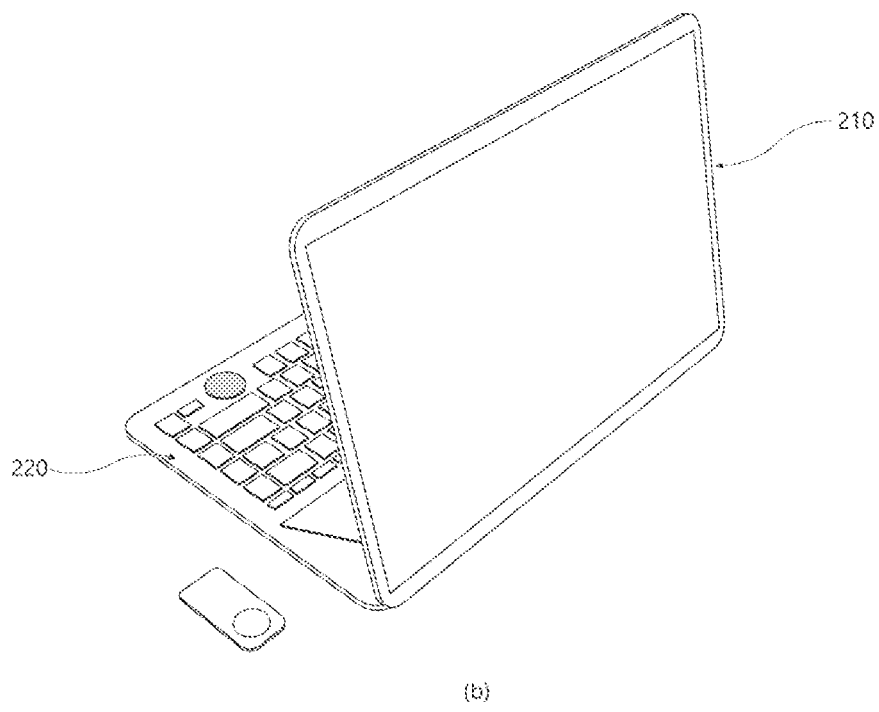
(b)

LAPTOP HAVING DUAL MONITORS THAT ARE ARRANGED VERTICALLY

CROSS REFERENCE TO RELATED APPLICATIONS

This application is a National Stage of International Application No. PCT/KR2020/007644 filed Jun. 12, 2020, claiming priority based on Korean Patent Application No. 10-2019-0070414 filed Jun. 14, 2019, the entire disclosures of which are incorporated herein by reference.

TECHNICAL FIELD

The present invention relates to a laptop having dual monitors that are arranged vertically, and more particularly, to a laptop having dual monitors that are arranged vertically to provide a separate sub monitor to an existing monitor to efficiently operate screens displayed on the monitor.

BACKGROUND ART

As is well known, in the reality of being provided with convenience and relying on image operations of devices such as computers or TVs as the advantages of the development of the culture and civilization, when it is considered that the contents of the screen displayed on the monitor are increasingly being provided in various forms and in large quantities, with the limited area of the existing monitor, there is a limit to providing contents in a desired format and amount to achieve the purpose of providing the contents in terms of screen content providers. Further, from the user's point of view, the user needs to bear the inconvenience and inefficiency of the screen operation due to the overlapped, divided, and reduced multiple screens provided through the limited area.

Therefore, a technique that contributes to efficient screen operation on the monitor by providing sub monitors is demanded to overcome the limitations of the limited amount and format to display the screen contents on the existing monitor.

In the meantime, when an additional sub monitor is provided while maintaining a structure and a shape of the existing laptop, the thickness and the weight of the device are increased by the installation of the additional sub monitors, which may go against the trend of light weight and size reduction of a portable all-in-one device. Therefore, it is required that even though the additional sub monitor is provided, the size reduction and the light weight are maintained.

CITATION LIST

[Patent Document 1] Korean Registered Patent Publication No. 1796683 (entitled Notebook including rotary hinge to implement bidirectional dual monitor, published on Nov. 10, 2017)
[Patent Document 2] Korean Registered Patent Publication No. 1440315 (entitled Notebook having sub monitor and display control method of the same, published on Oct. 2, 2014)

DISCLOSURE

Technical Problem

A technical object to be achieved by the spirit of the present invention is to provide a laptop having dual monitors that are arranged vertically to implement a sub monitor which provides an auxiliary screen while implementing the light weight and size reduction and implement a mouse module or a touch keyboard which replaces a touch pad to ensure an installation space of the sub monitor.

Technical Solution

In order to achieve the above-described objects, an exemplary embodiment of the present invention provides a laptop having dual monitors that are arranged vertically including: a main monitor having a vertical width of a first size; a main body having, on one side, a first hinge unit formed so as to fold the main monitor and a keyboard spaced from the first hinge unit so as to be arranged on the lower end of an upper plate; and a folder type sub monitor which has a vertical width of a second size which is relatively smaller than the vertical width of the first size and is adjacent to the keyboard so as to ascend at a certain inclined angle on the basis of a second hinge unit formed on the upper end of the upper plate of the main body, the screen is divided to provide different UIs respectively through the main monitor and the sub monitor.

Here, a 4D touch pad module is mounted to be disposed by replacing a direction key of the keyboard or a 4D touch pad module is configured to have a mouse type to be installed on the lower end of the one side of the sub monitor to be stored, and the 4D touch pad module includes: a disk-shaped touch pad which recognizes a coordinate to perform pointing; a division boundary layer which is formed above the touch pad and is configured by a ring-shaped first division boundary layer which divides an upper portion of the touch pad into a circular center touch pad and a side touch pad and a linear second division boundary layer which individually divides the side touch pad in an arc shape; a side button which has a through hole formed on a center area through which a touch pad wiring line passes and divides an outside area while accommodating the touch pad so as to expose an upper portion of the touch pad to perform a side button function by pushing the side touch pad; a FPCB which has a touch pad FPCB connection part formed in a center area to which the touch pad wiring line is connected and two or more side button contacts which are radially disposed at an outside area corresponding to the side button to be electrically connected by pushing the side button, respectively; and upper/lower housings in which the division boundary layer, the touch pad, the side button, and the FPCB are sequentially laminated to be accommodated therein, short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch of the center touch pad and the movement continues according to the touch response sensitivity without repeatedly touching while the touch is maintained after reaching the side touch pad so that the long-distance pointing of a desired pointing coordinate is performed when the touch is released after reaching a desired pointing coordinate to perform the unlimited long-distance pointing as long as desired even with a very small area of the touch pad.

Further, the mouse type 4D touch pad module may be configured as an integrated module which is coupled to one side surface of the main body on the lower end of the sub monitor to interwork with the keyboard or a separated module which is withdrawn from one side surface of the main body on the lower end of the sub monitor to be wirelessly connected to the keyboard to be driven.

Further, the side touch pad and the side button are divided by the second division boundary layer into four side touch pads of STU, STD, STL, and STR and four side buttons of SBU, SBD, SBL, and SBR with the same interval, respectively, various functions of a graphic controller are performed by one or a specific combination of the center touch pad, the side touch pad, and the side button. Further, the division boundary layer may be set to have a height of 0.5 mm to 1.0 mm enough to recognize a boundary and easily cross the boundary while touching during the interworking by a specific combination.

Further, the second size may be formed to be 35% to 45% of the first size.

Further, a main screen and an auxiliary screen are divided by UI manipulation of a user to be displayed on the main monitor and the sub monitor, respectively, the main monitor displays a main screen which is working and the sub monitor displays pop-up ads or a program update notification or plays and displays Youtube or displays messengers or SNS, the main monitor displays a documentation tool, a development tool, or an image editing tool and the sub monitor disposes a ribbon menu of the corresponding tool to be displayed, or the main monitor displays multiple video conference images and the sub monitor may display an auxiliary screen for sub tasks.

Further, UIs which are modified and changed to be provided by the program providers are separated for a main screen and an auxiliary screen to be displayed on the main monitor and the sub monitor, and the main monitor displays a main screen which is working and the sub monitor may display a list of programs which are being activated or recently used files or recently used programs.

Further, the main monitor displays a Youtube video in a Youtube full screen mode and the sub monitor displays a list of Youtube videos to be played, the main monitor displays a streamer image and the sub monitor displays a chatting screen, the main monitor displays a slideshow screen of a presentation program and the sub monitor displays a slide thumbnail screen or an editing screen of the presentation program, or the main monitor displays a search result list page of web shopping homepages and the sub monitor may display product detail information pages for a product selected from the search result list.

Further, the keyboard may be configured by a multi-function touch keyboard which includes a touch sensor which includes a keycap unit in which letter keycaps, function keycaps, number keycaps, special keycaps, and direction keycaps are formed; a driving circuit which is configured by contacts and membrane switches connected to lower ends of corresponding keycaps of the keycap unit; a support which supports the membrane switch; a touch pad configured by touch sensors formed on upper ends of a plurality of keycaps which is grouped with a specific shape; a left click key and a right click key formed to be adjacent to both ends of the touch pad; and a controller which interworks with the touch of the touch pad to move a cursor and performs a click function by pushing the click key, the touch pad is formed by grouping up to letter keycaps to form an inverted tringle with respect to the space keycap, the click keys are formed on both ends of the space keycaps, the touch sensor is formed above the space keycap, six keycaps in a lower end line, seven keycaps in a middle line, and eight keycaps in an upper end line to performs a touch pad function as a graphic controller while performing a basic function as a keyboard.

Further, a third hinge unit which is rotatably hinged left and right at 90° to 180° is formed on a lower end of the first hinge unit formed to fold the main monitor in a vertical direction of the main body to be fixedly formed at one side of the main body.

Advantageous Effects

According to the present invention, when an additional sub monitor to display a screen is provided, it is a welcome change for program providers as it overcomes a spatial limitation for providing various types of screens and additional functions of screen operation. Further, when such a sub monitor is provided, the program providers may seek a way to efficiently divide the screen to have the same effect as using a larger monitor than the actual monitor so that the benefit of efficient screen operation may be provided to the users.

Further, when the sub monitor is provided, the user may not only enjoy the benefit of the efficient screen division provided by the program providers, but also operate the screen according to the user's preference and efficiency using a screen which is provided to arbitrarily change the shape and be rearranged as desired by the user.

Further, a touch pad is removed to utilize a space occupied by the touch pad as a space for a sub monitor which provides an auxiliary screen and it perfectly functions as a graphic controller even with a very small area and a ultra-thin thickness so that a multi-function touch keyboard including a 4D touch pad module and a touch sensor replaces the touch pad of the existing laptop and occupies the very small space of the keyboard. Therefore, it may be a solution to ensure an installation space of the sub monitor to provide an auxiliary screen.

Further, there is no objection that both the program providers and the users enjoy the benefits of the sub monitors. Therefore, the provision of the dual monitors for screen operation will naturally become standardized as a trend and in the end, the program providers may provide various shapes of screens and functions suitable for the dual monitors having a standardized ratio as a trend, which may become a trigger to reorganize the market by preparing the turning point of the change in the monitor providing mode.

Moreover, a touch sensor of the touch pad performs the function by being attached onto a surface of the keyboard. At this time, the touch sensor is not attached on the entire surface of the keyboard. Instead, in consideration of the efficiency and the convenience of the operation and the economic feasibility of production, at least an area as much as the existing touch pad is provided and the touch sensor is attached in an inverted triangular shape from a space bar of the basic keyboard to a surface of letter keyboards to replace the existing mouse and the touch pad of the laptop which perform as a graphic controller. Therefore, the inconvenience of operating the computer with a separate graphic controller is excluded and specifically, in the laptop, the touch pad is replaced to be removed so that the keyboard touch pad occupied by the touch pad and a space occupied by a palm rest on a lower end are utilized to provide an efficient function. Further, the space bar is divided to configure a left click key and a right click key to perform a left-right click function of the mouse or the touch pad.

DESCRIPTION OF DRAWINGS

FIG. 1 schematically illustrates a cross-sectional view and a side view of a laptop having dual monitors that are arranged vertically according to an exemplary embodiment of the present invention, respectively.

FIG. 2 illustrates a folding operation of a sub monitor of a laptop having dual monitors that are arranged vertically of FIG. 1.

FIG. 3 illustrates an application of a 4D touch pad module of a lap top having dual monitors that are arranged vertically of FIG. 1.

FIG. 9 illustrates a usage example of a multi-function touch keyboard including a touch sensor of FIG. 8.

FIGS. 10A, 10B, 10C, 11A, and 11B illustrate examples of using divided monitors of a dual monitor laptop of FIG. 2 by UI manipulation of a user, respectively.

FIGS. 12A, 12B, 13A, 13B, 14, and 15 illustrate examples of using divided monitors of a dual monitor laptop of FIG. 2 by UI provided by a program provider, respectively.

FIGS. 17A, 17B, and 18 illustrate a rotation structure of a main monitor of a laptop having dual monitors that are arranged vertically of FIG. 1.

MODES OF THE INVENTION

Figure 4:
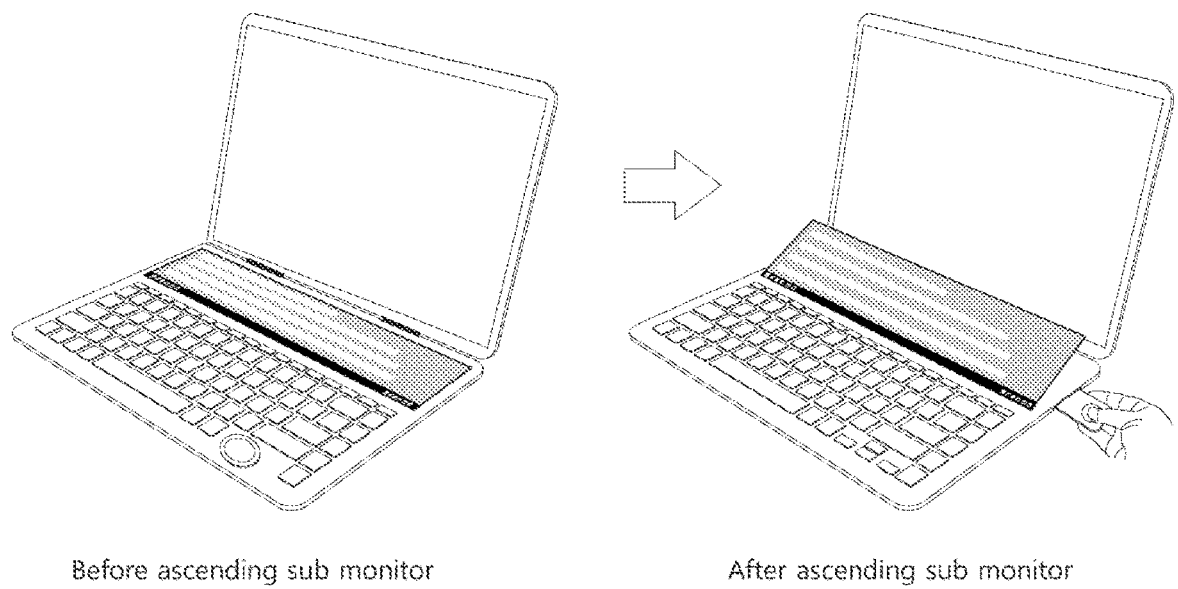
FIG. 4 illustrates a usage example of a laptop having dual monitors that are arranged vertically of FIG. 1.

Hereinafter, embodiments of the present invention having the above-described features will be described in more detail with reference to the accompanying drawings.

Referring to FIGS. 1 to 4, the laptop having dual monitors that are arranged vertically according to the exemplary embodiment of the present invention includes a main monitor 210 having a vertical width of a first size, a main body 220 having, on one side thereof, a first hinge unit 221 formed so as to fold the main monitor 210 and a keyboard 222 spaced from the first hinge unit 221 so as to be arranged on the lower end of an upper plate, and a folder type sub monitor 230 which has a vertical width of a second size that is relatively smaller than the vertical width of the first size, and which is adjacent to the keyboard 222 so as to ascend at a certain inclined angle on the basis of a second hinge unit 231 formed on the upper end of the upper plate of the main body 220, on the whole, and divides the screen so that different UIs may be respectively provided through the main monitor 210 and the sub monitor 230.

Here, the second size of the sub monitor 230 is formed to be 35% to 45%, desirably, 40% of the first size of the main monitor 230 while maintaining a horizontal width to be the same, so that the light weight may be implemented by minimizing a weight due to the sub monitor 230 while ensuring a readability and an availability of the sub monitor 230.

Therefore, as illustrated in FIG. 4, according to the efficiency and the convenience of the user, when the laptop is used, the upper end of the sub monitor 230 ascends with the second hinge unit 231 as a rotation axis to be inclined at a predetermined angle to be operated as a monitor for an additional task or an auxiliary task.

In the meantime, the monitor operation for the additional task or the auxiliary task by the sub monitor 230 will be described in detail with reference to FIGS. 10 to 15 as follows.

First, a main screen and an auxiliary screen are divided by the UI manipulation according to the user's preference and efficiency to be displayed on the main monitor 210 and the sub monitor 230, respectively.

That is, in the case of the screen provided to arbitrarily change and rearrange a shape as desired by the user, the screen may be divided to be operated in accordance with the user's preference and efficiency.

As illustrated in FIGS. 10A, 10B, 10C, and 11, a screen operation example which efficiently operates the screen by separately and appropriately disposing the main screen on the main monitor 210 and disposing the auxiliary screen on the sub monitor 230 according to the convenience of the user will be described in detail as follows.

Referring to FIGS. 10A to 10C, the main monitor 210 displays a main screen for document editing which is working or web surfing and the sub monitor 230 displays pop-up ads (FIG. 10A) or a program update notification or plays and displays Youtube (FIG. 10B) or displays a messenger or SNS (FIG. 10c).

Therefore, a pup-up screen such as pop-up ads and a program update notification which suddenly appears without any notice during the working is displayed as the top screen by covering the main screen which is working, which may always cause the inconvenience and dissatisfaction to users who want to focus on their tasks. Therefore, the window taskbar is moved to be displayed on the auxiliary screen to display all the ads and pop-up screens on the auxiliary screen so that the inconvenience and the dissatisfaction may be solved.

Further, when the user wants to perform document editing or web surfing while watching Youtube, it is inconvenient to divide the screen to adjust the windows to have smaller sizes to see both the windows to perform multi-tasking. In order to overcome the inefficiency and the inconvenience, the document editing or web surfing screen is disposed on the main screen and Youtube is played on the auxiliary screen to simply enable the multi-tasking.

Further, when a program which interworks with smartphone, such as messengers (KakaoTalk, Line, Facebook messenger) or SNS (Twitter, Facebook, Instagram) is used while performing a main task such as document editing or web surfing, the screens are displayed to be overlaid so that it is inconvenience to check or transmit messages. Therefore, when the document editing or web surfing screen is disposed on the main screen and the messenger or SNS screen is disposed on the auxiliary screen, the message may be checked without switching screens to conveniently perform the multi-tasking.

Further, referring to FIGS. 11A and 11B, a documentation tool, a development tool, or an image editing tool is displayed on the main monitor 210 and a ribbon menu of the corresponding tool is disposed on the sub monitor 230 (FIG. 11A) or multiple video conference images are displayed on the main monitor 210 and an auxiliary screen for a sub task is displayed on the sub monitor 230220 (FIG. 11B).

Therefore, in order to embrace the demands of the users which become more complex, the functions of documentation tools, development tools, and image editing tools have been diversified. Therefore, the number of icons to be displayed in the ribbon menu is increasing so that an area for displaying the menu is getting larger and an available main screen of the main monitor 210 for a task is getting smaller.

In order to improve this, when the ribbon menu for each tool and a main task window are separated to dispose only the main task window on the main screen and dispose the ribbon menu on the auxiliary screen, the space utilization is maximized to provide the main task window in the maximum size.

Further, when auxiliary materials required for the meeting is searched during the video conference in a full screen mode with multiple participants or the meeting is conducted while viewing materials to be referenced in the meeting, the efficient video conference may be made possible by searching for the materials or executing the reference materials on the auxiliary screen.

Next, as illustrated in FIGS. 12 to 15, UIs which are modified and changed to be provided by the program providers are divided into a main screen and an auxiliary screen to be displayed on the main monitor 210 and the sub monitor 230, respectively.

That is, when the user may not arbitrarily modify, change, and dispose the UIs, in order to efficiently use a screen space of the dual monitors, a company which provides the program originally modifies and changes the UI of the screen to be appropriate for the dual monitors to allow the space to be efficiently used. Such a screen operation example will be described in detail as follows.

Referring to FIGS. 12A and 12B, the main monitor 210 may display the main screen which is working and a sub monitor may display a list of programs which are being activated (FIG. 12A) or display recently used files or recently used programs (FIG. 12B).

Therefore, as illustrated in FIG. 12A, the sub monitor 230 is used as a display area of a taskbar/[a list of programs which are currently being activated]. When alt-tab or win-tab keys are input, the [list of programs which are being currently activated] is displayed and a program is selected from the list to switch the window to the main window to be displayed. Even though there is a disadvantage in that the [list of programs which are being currently activated] is displayed on the main window which is working, if the auxiliary screen is utilized to always display the [list of programs which are being currently activated], the switching to a necessary program may be possible only by one operation.

Further, as illustrated in FIG. 12B, when win-tab keys are input, a [list of programs which have been activated so far] is displayed at the bottom of the [list of programs which are currently being activated]. When a program is selected from the list, the corresponding program is executed to be displayed as the main window. However, in this case, there are disadvantages in that the [list of programs which have been activated so far] is displayed on the main window which is working and the list may be seen after two operations of pushing win-tab keys and moving to the down, so that if the auxiliary screen is utilized to always display the [list of programs which have been activated so far], the switching to a necessary program may be easily performed.

Figure 15:
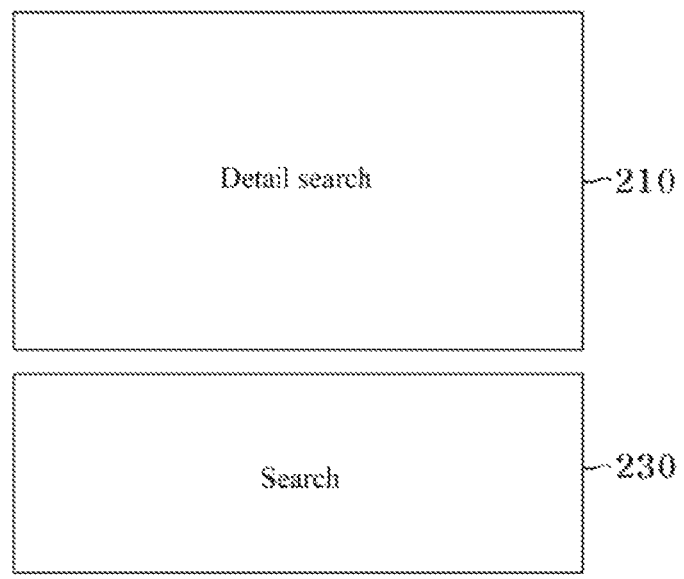

Further, referring to FIGS. 13 to 15, the main monitor 210 displays a Youtube video in a Youtube full screen mode and the sub monitor 230 displays a list of Youtube videos to be played (FIG. 13A). Alternatively, the main monitor 210 displays a streamer image and the sub monitor 210 displays a chatting screen (FIG. 13B). Further, the main monitor 210 displays a slideshow screen of a presentation program and the sub monitor 230 displays a slide thumbnail screen or an editing screen of the presentation program (FIG. 14), or the main monitor 210 displays a search result list page of web shopping homepages and the sub monitor 230 may display product detail information pages for a product selected from the search result list (FIG. 15).

Therefore, in order to watch another video while watching the Youtube in a full screen mode, the full screen mode needs to be finished to select another video. However, if the Youtube is played on the main screen in the full screen mode and a video to be played next is selected while watching a list to be played on the auxiliary screen, it may be convenient to watch the next video by one operation.

Further, during a network game and Youtube broadcast, users with a common purpose are gathered to chat to communicate to each other while playing games or watching the broadcast. At this time, chats are mainly displayed on one side of the screen to be displayed in a part of a game screen or a broadcasting screen. However, on the Youtube, the broadcasting screen is displayed in the full screen mode, the chats may not be watched. Therefore, even though the chatting screen is separated from the network game screen or the Youtube broadcasting screen to display the game screen or the broadcasting screen on the main screen in the full screen mode, the chats are displayed on the auxiliary screen so that the game playing or Youtube broadcast watching may be smoothly performed.

Further, when the screen is moved to a slide show screen while editing the slide in the PowerPoint, the slide is displayed in the full screen mode so that in order to edit the slide or select another slide, it is inconvenient to end the slide screen displayed in the full screen mode. Therefore, if the slide thumbnail screen or an editing screen is disposed on the auxiliary screen to be displayed while always displaying the slide show screen on the main screen, the edition and the selection of the other slide may be conveniently performed while checking the slide show screen.

Further, in a general web shopping homepage, when a product is selected from a search result list after searching a product, the screen moves to a detailed information page screen so that it is inconvenient to shop by moving forward and backward between the search result list page and the product detail information page. Therefore, when the product detail information page selected from the product search result list is displayed on the main screen by displaying the product detail information page on the main screen and the search result list page on the auxiliary screen, the product detail information page may be seen by one selection, which may double the convenience of the shopping.

Figure 5A:
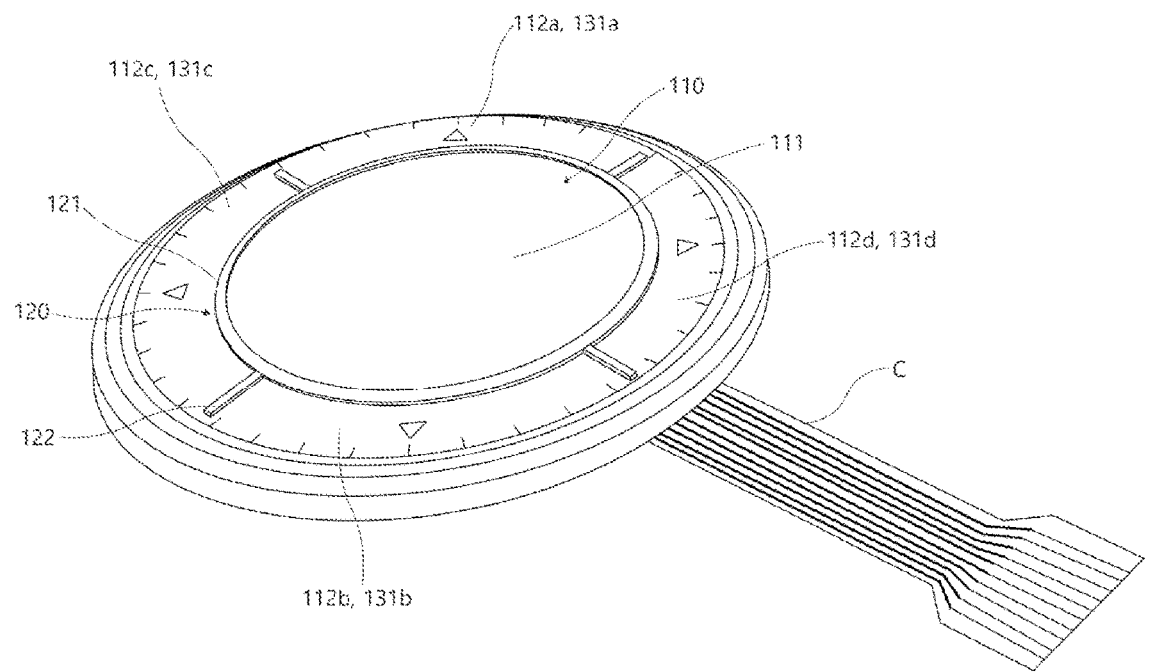
FIGS. 5A and 5B illustrate exploded views of a 4D touch pad module of FIG. 3.
Figure 5B:
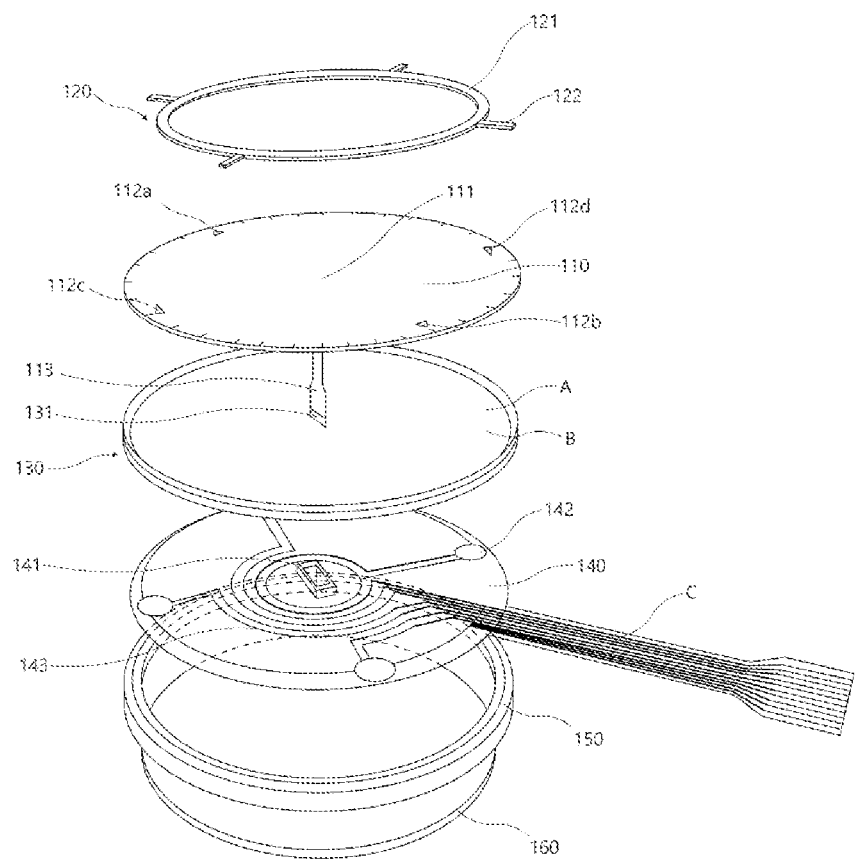
Figure 6A:
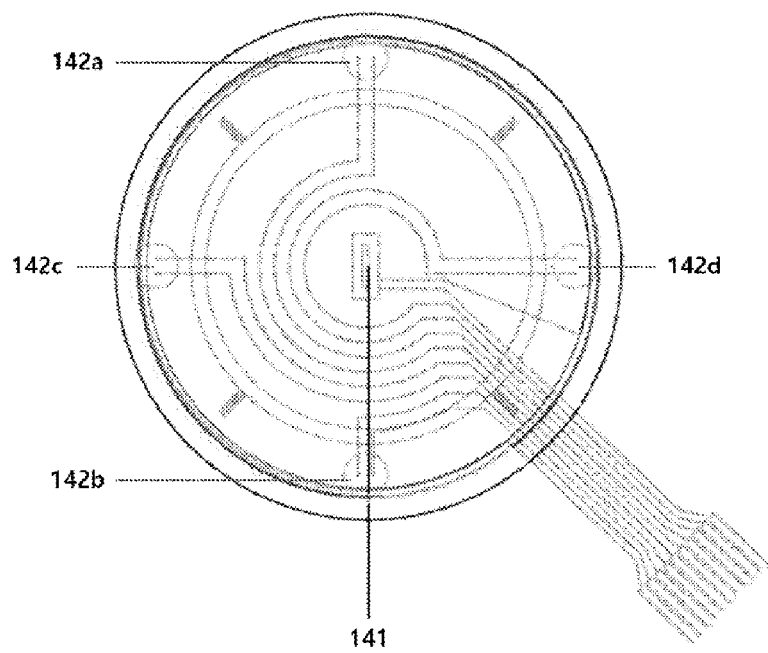
FIGS. 6A and 6B illustrate a wiring diagram of a FPCB of a 4D touch pad module of FIG. 5 and a pushing operation of a side button.
Figure 6B:
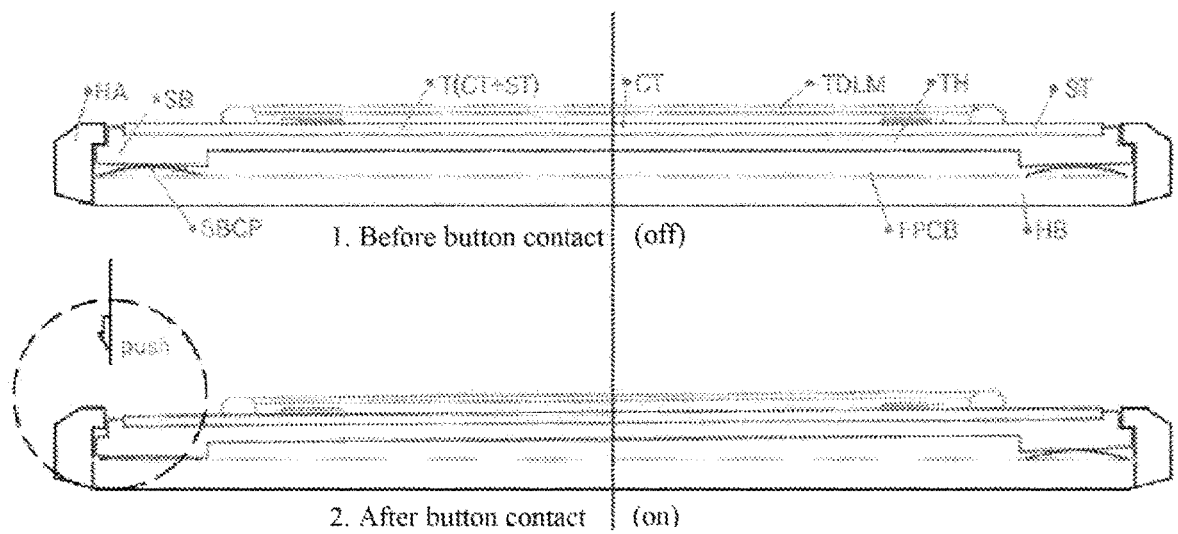

In the meantime, as illustrated in FIGS. 3, 5, and 6, instead of direction keys 222a of a keyboard 222, a 4D touch pad module 100A is mounted or a 4D touch pad module is configured to have a mouse shape 100B to be installed and stored on the lower end of the one side of the sub monitor 230, so that the 4D touch pad module 100A which functions as a graphic controller with a ultra-thin thickness and a ultra-small size is mounted on the keyboard or the mouse 100B having the 4D touch pad module mounted therein is provided to replace the touch pad.

For example, as illustrated in FIG. 3A, the 4D touch pad module 100A is mounted in a position where the direction keys 222a of the keyboard of the existing laptop are disposed. At this time, the 4D touch pad module 100A may function not only as a graphic controller, but also as direction keys.

Alternatively, as illustrated in FIGS. 3B and 4, a mouse 100B which is a separate ultra-thin and ultra-small graphic controller with a 4D touch pad module mounted therein is manufactured to be installed below the sub monitor 230.

Here, the mouse type 4D touch pad module 100B may be configured as an integrated module which is physically coupled to one side surface of the main body 220 on the lower end of the sub monitor 230 to interwork with the keyboard 222 or may be configured as a separated module which is withdrawn from one side surface of the main body 220 on the lower end of the sub monitor 230 to be wirelessly connected to the keyboard 222 to be driven.

As illustrated in FIGS. 5 and 6, a 4D touch pad module specifically, includes a touch pad 110, a division boundary layer 120 divided into a center touch pad area and respective side touch pad areas, a side button 130 which performs a side button function by pushing side touch pads 112a, 112b, 112c, and 112d, an FPCB 140 having a touch pad FPCB connection part 141 and a side button contact 142 formed thereon, and upper/lower housings 150 and 160. The short-distance pointing is performed only by a center touch pad 111 and the long-distance pointing is performed in parallel by a combination of the center touch pad 111 and the side touch pads 112a, 112b, 112c, and 112d. In the case of the long-distance pointing, a touch response sensitivity when the touch starts from the center touch pad and then reaches the corresponding side touch pad is stored. Therefore, the movement continues according to the stored touch response sensitivity even without repeated touches while the touch is maintained after reaching the side touch pads 112a, 112b, 112c, and 112d so that when the touch reaches a desired pointing coordinate, and then is released, the long-distance pointing of a desired pointing coordinate is performed, thereby performing unlimited long-distance pointing as long as desired even with the very small area of the touch pad 110.

First, the touch pad 110 is formed to have a disk shape and recognizes a pointing coordinate by the touch of the touch sensor (not illustrated) to perform the pointing.

For example, the touch pad 110 may be configured to be divided into a center touch pad 111 which performs the short-distant pointing alone and side touch pads 112a, 112b, 112c, and 112d which perform long-distance pointing and various basic functions of the touch pad and additional functions which are not provided by the touch pad of the related art in parallel.

Here, the side touch pads 112a, 112b, 112c, and 112d are configured to be divided by a second division boundary layer 122 to be described below into four side touch pads corresponding to side touch up (STU) 112a, side touch down (STD) 112b, side touch left (STL) 112c, and side touch right (STR) 112d, with the same interval.

In the meantime, to be more specific, the long-distance pointing is designed such that a touch response sensitivity is stored when the touch reaches the side touch pads 112a, 112b, 112c, and 112d after starting the touch by the center touch pad 111 and the movement continues according to the stored touch response sensitivity even without repeated touches while the touch is maintained after reaching the side touch pads 112a, 112b, 112c, and 112d. Therefore, when the touch is released after reaching a desired pointing coordinate, the long-distance pointing of the desired pointing coordinate is performed.

As described above, a touch response sensitivity when the touch reaches the side touch pads 112a, 112b, 112c, and 112d after starting from the center touch pad 111 is stored and unlimited movement is allowed according to the stored touch response sensitivity even without repeated touches while the touch is maintained after reaching the side touch pads 112a, 112b, 112c, and 112d so that the long-distance pointing for as long as desired may be efficiently and conveniently performed even with the very small area which is not comparable with the touch pad of the related art.

Next, the division boundary layer 120 is formed above the touch pad 110 and is configured by a ring shaped first division boundary layer 121 which divides an upper area of the touch pad 110 into a circular center touch pad 111 and side touch pads 112a, 112b, 112c, and 112d at the outside and a linear second division boundary layer 122 which uniformly and individually divides the side touch pads 112a, 112b, 112c, and 112d in an arc shape.

Here, the division boundary layer 120 is set to have a height of 0.5 mm to 1.0 mm enough to recognize a boundary between the center touch pad 111 and the side touch pads 112a, 112b, 112c, and 112d and easily cross the boundary while touching during the interworking by a specific combination of the center touch pad 111 and the side touch pads 112a, 112b, 112c, and 112d for the long-distance pointing.

That is, the division boundary layer 120 divides the touch pad 110 to perform various subdivided functions and allow a user to easily recognize a physical boundary by the first division boundary layer 121 and the second division boundary layer 122 with a sense of touch of a finger to prevent an erroneous operation over a boundary of a selective function set for the center touch pad 111 and each side touch pad 112a, 112b, 112c, and 112d.

Next, the side button 130 has a through hole 131 through which a touch pad wiring line 113 passes in a center region and is configured to serve as a housing A which accommodates the touch pad 110 to expose an upper portion of the touch pad 110. Further, an outside area thereof is divided by the second division boundary layer 112 to serve as a corresponding side button function B by pushing the corresponding side touch pads 112a, 112b, 112c, and 112d.

Here, the side button 130 is configured to be divided by the above-described second division boundary layer 122 into four side buttons corresponding to side button up (SBU) 131a, side button down (SBD) 131b, side button left (SBL) 131c, and side button right (SBR) 131d, with the same interval.

In the meantime, only one or a specific combination of the center touch pad 111, the side touch pads 112a, 112b, 112c, and 112d, and the side button 130 may faithfully perform various functions such as a basic function as a graphic controller and additional functions.

Next, in the FPCB 140, a touch pad FPCB connection part 141 to which the touch pad wiring line 113 is electrically connected is formed in a center region and two or more elastic side button contacts 142 which are radially disposed at an outside region corresponding to the side button 130 to be electrically connected by pushing the corresponding side button 130 are formed, respectively.

For example, the first to fourth side button contacts 142a, 142b, 142c, and 142d corresponding to the side buttons 130 of SBU 131a, SBD 131b, SBL 131c, and SBR 131d are formed, respectively.

Further, one side button (SB; 132a, 132b, 132c, and 132d) is pushed to electrically conduct one corresponding side button contact (SBCP; 142a, 142b, 142c, and 142d) to recognize click, double click, and long press of the side button SB.

Next, in the upper/lower housings 150 and 160, the division boundary layer 120, the touch pad 110, the side button 130, and the FPCB 140 are sequentially laminated to be accommodated therein.

Further, a circuit line C configured by the touch pad wiring line 113 and the side button wiring line 144 may be electrically connected to a connection terminal (not illustrated) of an external device by means of a connection groove (not illustrated) formed at one side of the upper housing 150 or the lower housing 160.

Therefore, the 4D touch pad module fuses the advantages of the mouse and the touch pad of the related art and resets an operation principle simultaneously so that even though an area of the touch pad of the related art provided from the laptop is not very satisfactory for users, the 4D touch pad module is equipped with a touch pad having a small area which is incomparable to the area of the existing touch pad and is ultra-thin and compact. However, the 4D touch pad sufficiently functions as the mouse, like the existing mouse or touch pad and additionally provides a new function which has not been provided by the existing mouse or touch pad to double the efficiency and the convenience.

Further, it perfectly functions as the graph controller with a very small area and a ultra-thin thickness so that the 4D touch pad module replaces the touch pad of the existing laptop and occupies a very small space of the keyboard so that it may be a solution to ensure a sub monitor installation space for providing an auxiliary screen.

Figure 7A:
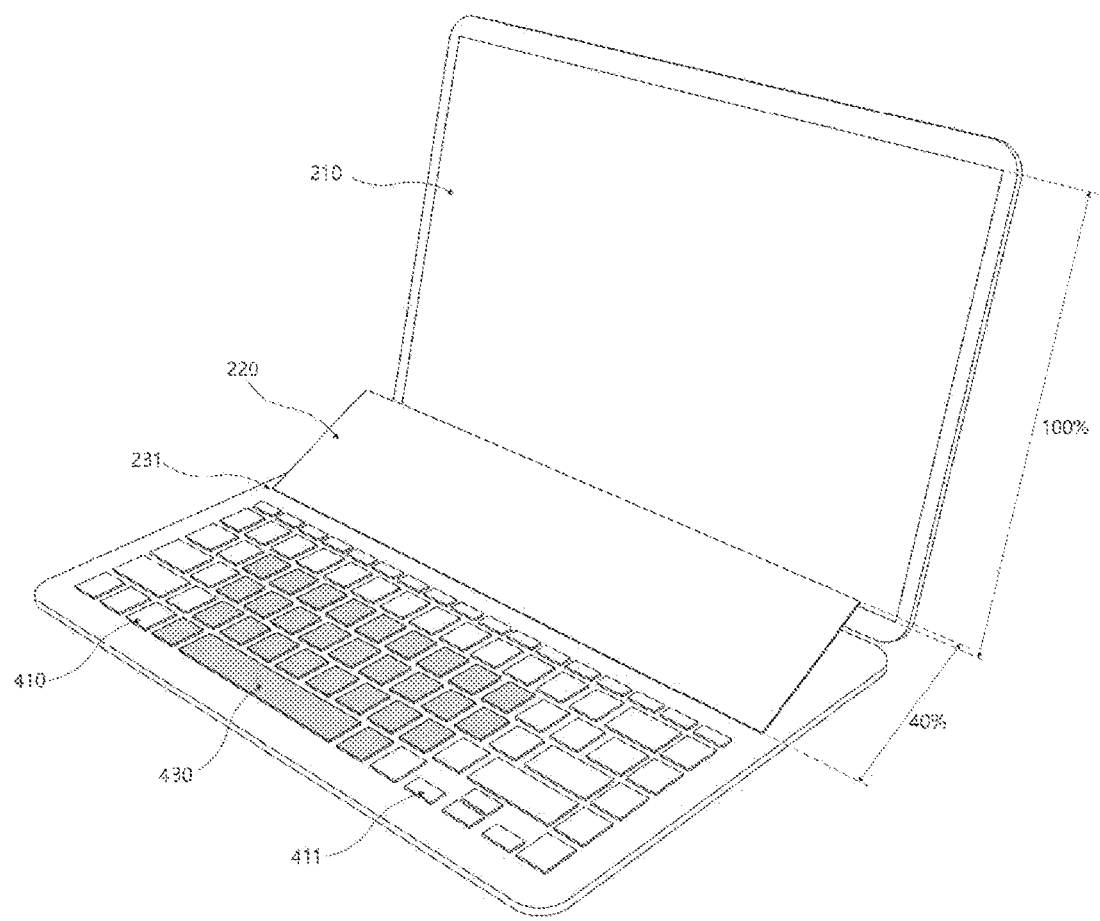
FIGS. 7A, 7B, and 8 illustrate an example of a multi-function touch keyboard including a touch sensor of a laptop having dual monitors that are arranged vertically of FIG. 1.
Figure 7B:
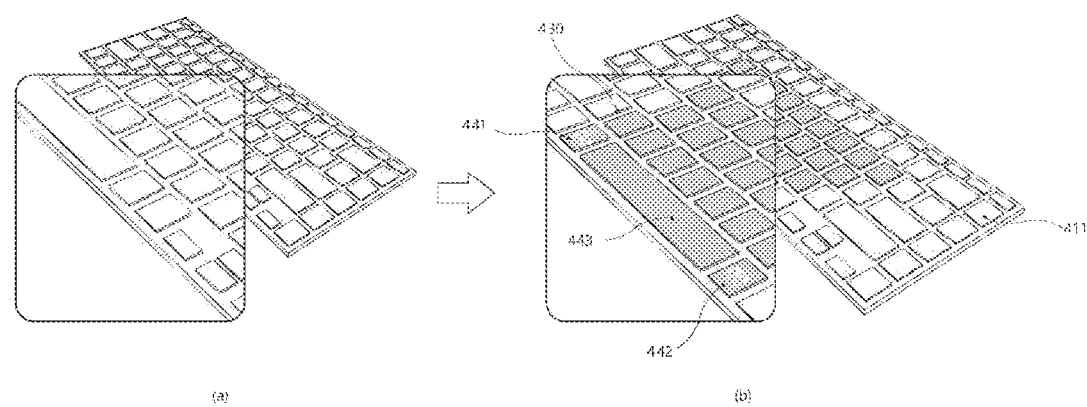
Figure 8:
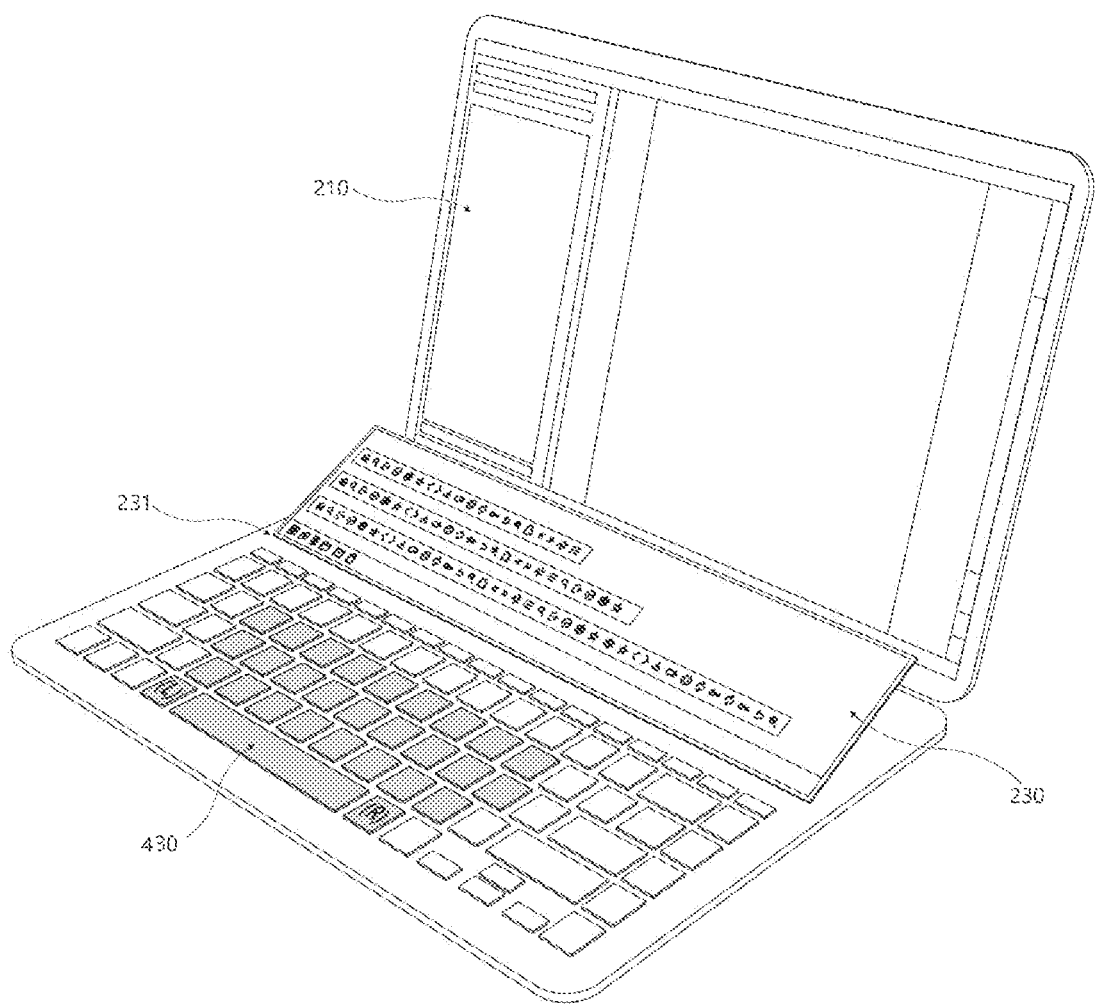

In the meantime, FIGS. 7 and 8 illustrate an example of a multi-function touch keyboard including a touch sensor of a laptop having dual monitors that are arranged vertically of FIG. 1, and FIG. 9 illustrates a usage example of a multi-function touch keyboard including a touch sensor of FIG. 8.

Referring to FIGS. 7 to 9, a multi-function touch keyboard including a touch sensor includes a keycap unit 410, a driving circuit (not illustrated), a support (not illustrated), a touch pad 430 configured by touch sensors formed on upper ends of a plurality of keycaps 411 which is grouped with a specific shape, a left click key 441 and a right click key 442 formed to be adjacent to both ends of the touch pad 430, and a controller (not illustrated) configured to move a cursor by interworking with the touch of the touch pad 430 and perform a click function by pushing the click key to perform a basic function as a keyboard and a touch pad function as a graphic controller.

First, the keycap unit 410 is configured by letter keycaps, function keycaps, number keycaps, special keycaps, and direction keycaps which are disposed in various forms according to a type of the computers such as a desktop, a laptop, or a ultra-book to be applied and various keyboard specifications, such as 86-key, 101-key, 103-key, or 106-key.

Next, the driving circuit is configured by contacts and membrane switches coupled to lower ends of corresponding keycaps 411 of the keycap unit 410 to be configured in various forms according to a membrane type, a non-contact type, or a mechanical type and correspondingly, the support may support the membrane switches.

Next, the touch pad 430 is configured by a plurality of touch sensors which is formed on upper ends of the plurality of keycaps 411 which is grouped with a specific shape.

Here, the touch pad 430 may be formed by grouping up to letter keycaps to form an inverted triangle shape with respect to the space keycap 443.

For example, the touch sensor is formed on upper ends of the space keycap 443, six keycaps (from a letter "C" to a symbol ",") 111 in a lower end line, seven keycaps (from a letter "D" to a letter "L") 111 in a middle line, and eight keycaps (from a letter "E" to a letter "P") 111 in an upper end line to configure an inverted triangular touch pad 430.

In the meantime, a partition (not illustrated) having a predetermined height is formed on an upper edge of the corresponding keycaps 411 which configure an outer circumferential line of the touch pad 430 to distinguish a touch area of the touch pad 430.

That is, the touch area is recognized by a tactile sense along the outer circumferential line of the touch pad represented with different colors as illustrated in FIGS. 7A and 7B to recognize the touch pad 430 without causing the user's gaze to be departed from the screen which is working on.

Alternatively, the corresponding keycaps 411 which configure the outer circumferential line of the touch pad 430 and the other adjacent keycaps 411 are formed to be spaced from each other with a predetermined interval to distinguish a touch area of the touch pad 430.

That is, a marginal space is disposed between the keycap 411 of the touch pad 430 and the other adjacent keycaps 411 so that the touch area is recognized by a tactile sense to recognize the touch pad 430 without causing the user's gaze to be departed from the screen which is working on.

Next, the left click key 441 and the right click key 442 which perform a left click function and a right click function of a normal touch pad or mouse are formed to be adjacent to both ends of the touch pad 430.

That is, as enlarged in FIG. 7B, the left click key 441 and the right click key 442 are separately formed at both ends of the space keycap 443 to perform the left click function and the right click function by pushing the left click key 441 and the right click key 442.

Here, the left click key 441 and the right click key 442 may divide both ends of the space keycap 443 provided with a sufficient area to have a size of a letter keycap to provide the left click button and the right click button.

In the meantime, left-right scroll is performed by touching the touch pad area left and right on an upper surface of the space keycap 443 by interworking with double stroke of the right click key 442 and up-down scroll is performed by touching the touch pad area up and down excluding the space keycap 443. Further, left click and double click are performed by stroke and double stroke of the left click key 441, respectively, and right click is performed by stroke of the right click key 442.

Next, the controller moves a cursor on the display by interworking with the touch of the touch pad 430 and performs a click function on the display by pushing the left click key 441 and the right click key 442.

As illustrated in FIG. 9A, the cursor is moved by interworking with the touch of the touch pad 430 and as illustrated in FIG. 9B, the click function is performed by pushing the left click key 441 and the right click key 442.

In the meantime, as illustrated in FIG. 8, the keycap unit 410 and the touch pad 430 are disposed in the position of the touch pad of the normal laptop or the palm rest at the bottom to form a separate sub monitor 230 in an available space on the upper end of the laptop, in addition to the main monitor 210, to be rotatably hinged with respect to the second hinge unit 231 to allow an efficient screen operation on the monitor which has been described in detail with reference to FIGS. 10 to 15.

Figure 16:
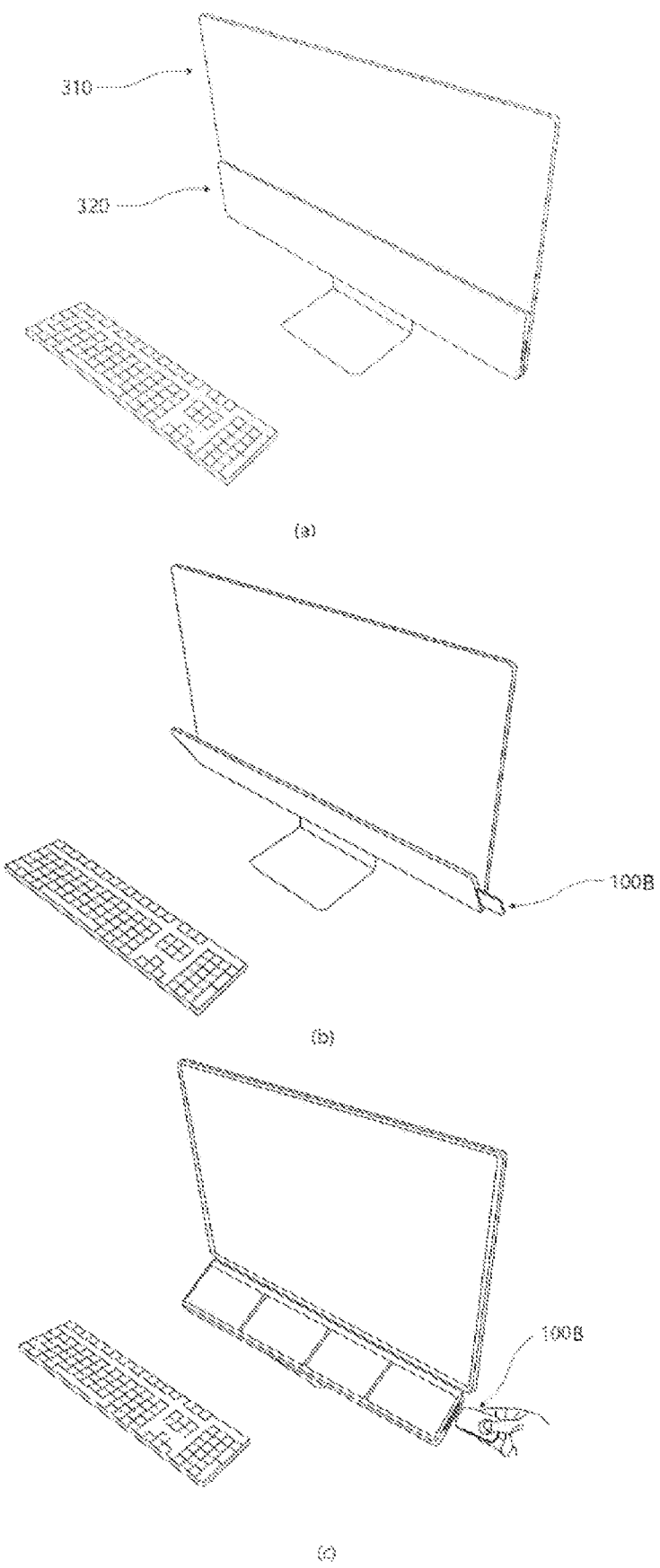
FIG. 16 illustrates a folding type dual monitor arranged vertically according to a modified embodiment of the present invention.

In the meantime, FIG. 16 illustrates a folding type dual monitor arranged vertically according to a modified embodiment of the present invention.

As illustrated in FIG. 16, a normal single monitor may be configured as folding type dual monitors that are arranged vertically. The folding type dual monitors that are arranged vertically according to the modified embodiment includes a main monitor 210 having a vertical width of a first size and a folding type sub monitor 320 which has a vertical width of a second size which is relatively smaller than the vertical width of the first size and ascends at a certain inclined angle on the basis of a hinge unit formed on a lower end of the main monitor 310 to divide the screen by the main monitor 310 and the sub monitor 320 to provide different UIs and may form a mouse type 4D touch pad module 100B installed to be stored on one side surface of the main body 220 on a lower end of the sub monitor 320.

Here, the usage example and the configuration of the laptop including dual monitors that are arranged vertically described above are applied to the usage example by a screen division configuration of the main monitor 310 and the sub monitor 320 and the configuration of the 4D touch pad module 100B in the same manner.

Figure 17A:
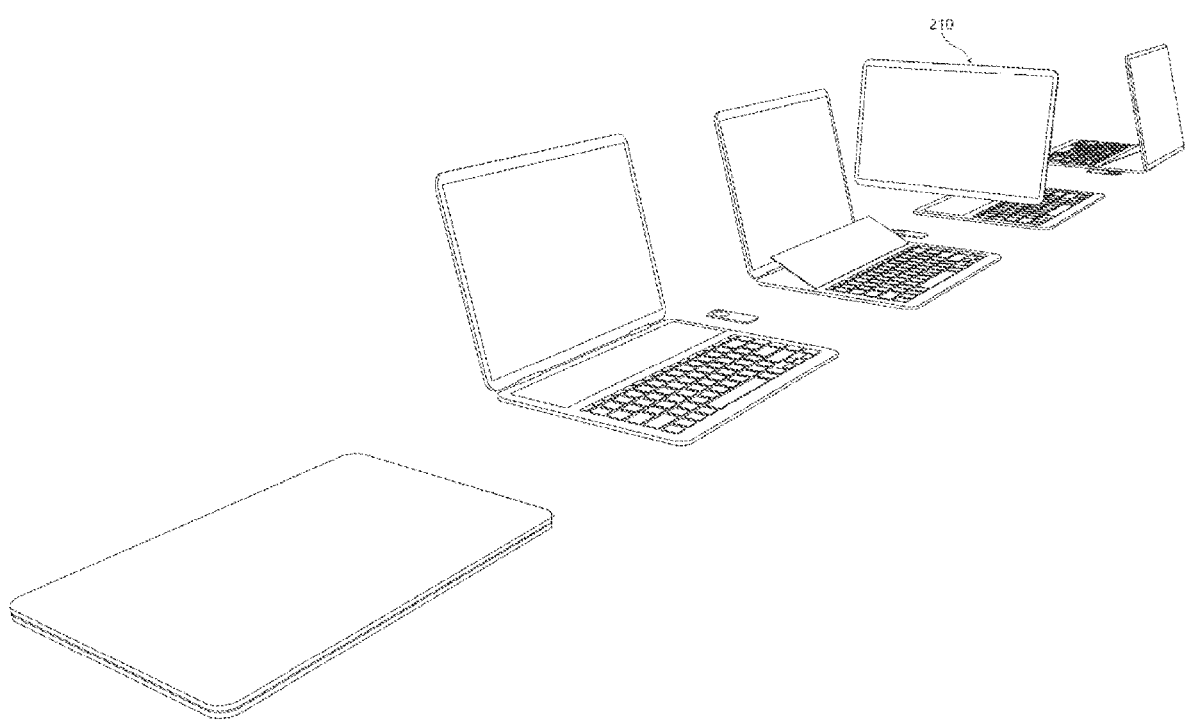
Figure 17B:
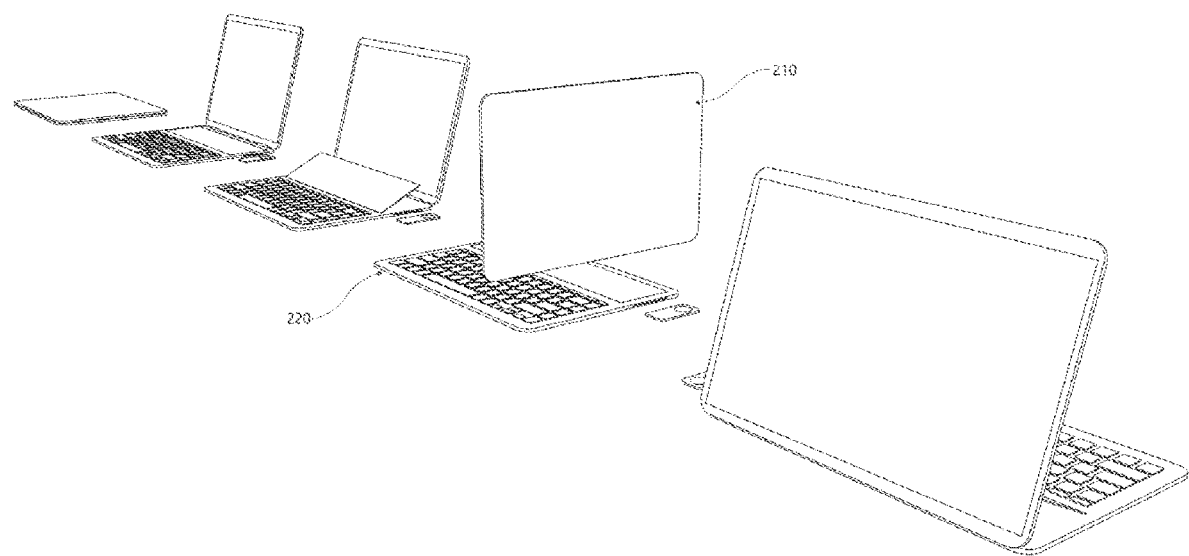

FIGS. 17 and 18 illustrate a rotation structure of a main monitor of a laptop having dual monitors that are arranged vertically of FIG. 1.

Referring to FIGS. 17 and 18, a third hinge unit 240 which is freely rotatably hinged left and right at 90° to 180° is fixedly formed on a lower end of the first hinge unit 221 formed to fold the main monitor 210 in a vertical direction of the main body 220 so that as illustrated in FIG. 17, the closed main monitor 210 is opened to be unfolded by the first hinge unit 221 and then is rotated left and right at 90° to 180° in a horizontal direction by the third hinge unit 240 according to the user's need to be conveniently used.

Accordingly, by the configuration of the laptop including dual monitors that are vertically arranged as described above, a touch pad is removed to utilize a space occupied by the touch pad as a space for a sub monitor which provides an auxiliary screen and it perfectly functions as a graphic controller even with a very small area and a ultra-thin thickness so that a touch keyboard including a 4D touch pad module and a touch sensor replaces the touch pad of the existing laptop and occupies the very small space of the keyboard. Therefore, it may be a solution to ensure an installation space of the sub monitor to provide an auxiliary screen.

Therefore, configurations illustrated in the embodiments and the drawings described in the present specification are only the most preferred embodiment of the present invention and do not represent all of the technical spirit of the present invention, and thus it is to be understood that various equivalents and modified embodiments, which may replace the configurations, are possible when filing the present application.

[Explanation of Reference Numerals and Symbols]

| | |
|---|---|
| 210, 310: Main monitor | 220: Main body |
| 221: First hinge unit | 222: Keyboard |
| 222a: Direction key | 230, 320: Sub monitor |
| 231: Second hinge unit | 240: Third hinge unit |
| 100A: Four dimensional touch pad module | |
| 100B: Mouse type four dimensional touch pad module | |
| 110: Touch pad | 111: Center touch pad |
| 112a, b, c, d: Side touch pad | 112a: STU |
| 112b: STD | 112c: STL |
| 112d: STR | 120: Division boundary layer |
| 121: First division boundary layer | 122: Second division boundary layer |
| 130: Side button | 131: Through hole |
| 132a: SBU | 132b: SBD |
| 132c: SBL | 132d: SBR |
| 140: FPCB | 141: Touch pad FPCB connection unit |
| 142a, b, c, d: Side button contact | 150: Upper housing |
| 160: Lower housing | |
| 410: Keycap unit | 411: Keycap |
| 430: Touch pad | 441: Left click key |
| 442: Right click key | 443: Space keycap |

The invention claimed is:

1. A laptop having dual monitors that are arranged vertically, comprising:

a main monitor having a vertical width of a first size;

a main body having, on one side, a first hinge unit 221 formed so as to fold the main monitor and a keyboard spaced from the first hinge unit so as to be arranged on a lower end of an upper plate; and a folder type sub monitor which has a vertical width of a second size which is relatively smaller than the vertical width of the first size and is adjacent to the keyboard so as to ascend at a certain inclined angle on the basis of a second hinge unit formed on an upper end of the upper plate of the main body, wherein a screen is divided to provide different UIs respectively through the main monitor and the sub monitor, wherein the keyboard is configured by a multi-function touch keyboard which includes a touch sensor which includes a keycap unit in which letter keycaps, function keycaps, number keycaps, special keycaps, and direction keycaps are formed; a driving circuit which is configured by contacts and membrane switches respectively connected to lower ends of corresponding keycaps of the keycap unit; a support which supports the membrane switch; a touch pad configured by touch sensors formed on upper ends of a plurality of keycaps which is grouped with a specific shape; a left click key and a right click key formed to be adjacent to both ends of the touch pad; and a controller which interworks with the touch of the touch pad to move a cursor and performs a click function by pushing the click key, the touch pad is formed by grouping up to letter keycaps to form an inverted tringle with respect to a space keycap, the click keys are respectively formed on both ends of the space keycap, the touch sensor is formed above the space keycap, six keycaps in a lower end line, seven keycaps in a middle line, and eight keycaps in an upper end line, the touch sensor being configured to perform a touch pad function as a graphic controller while performing a basic function as a keyboard, and wherein a 4D touch pad module is mounted to be disposed by replacing a direction key of the keyboard, or a 4D touch pad module is configured to have a mouse type to be installed on a lower end of one side of the sub monitor to be stored, and the 4D touch pad module includes:

a disk-shaped touch pad which recognizes a coordinate to perform pointing;

a division boundary layer which is formed above the touch pad and is configured by a ring-shaped first division boundary layer which divides an upper portion of the touch pad into a circular center touch pad and a side touch pad and a linear second division boundary layer which individually divides the side touch pad in an arc shape;

a side button which has a through hole formed in a center area through which a touch pad wiring line passes and divides an outside area while accommodating the touch pad so as to expose an upper portion of the touch pad to perform a side button function by pushing the side touch pad;

a FPCB which has a touch pad FPCB connection part formed in a center area to which the touch pad wiring line is connected and two or more side button contacts which are radially disposed at an outside area corresponding to the side button to be electrically connected by pushing the side button, respectively; and upper/lower housings in which the division boundary layer, the touch pad, the side button, and the FPCB are sequentially laminated to be accommodated therein, short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch of the center touch pad and the movement continues according to the touch response sensitivity without repeatedly touching while the touch is maintained after reaching the side touch pad so that the long-distance pointing of a desired pointing coordinate is performed when the touch is released after reaching a desired pointing coordinate to perform the unlimited long-distance pointing as long as desired even with a very small area of the touch pad.

2. The laptop having dual monitors that are arranged vertically according to claim 1, wherein the mouse type 4D touch pad module is configured as an integrated module which is coupled to one side surface of the main body on the lower end of the sub monitor to interwork with the keyboard or a separated module which is withdrawn from one side surface of the main body on the lower end of the sub monitor to be wirelessly connected to the keyboard to be driven.

3. The laptop having dual monitors that are arranged vertically according to claim 2, wherein the side touch pad and the side button are divided by the second division boundary layer into four side touch pads of STU, STD, STL, and STR and four side buttons of SBU, SBD, SBL, and SBR with the same interval, respectively, various functions of a graphic controller are performed by one or a specific combination of the center touch pad, the side touch pad, and the side button, and the division boundary layer is set to have a height of 0.5 mm to 1.0 mm enough to recognize a boundary and easily cross the boundary while touching during the interworking by a specific combination.

4. The laptop having dual monitors that are arranged vertically according to claim 2, wherein the second size is formed to be 35% to 45% of the first size.

5. The laptop having dual monitors that are arranged vertically according to claim 2, wherein a main screen and an auxiliary screen are divided by UI manipulation of a user to be displayed on the main monitor and the sub monitor, respectively, the main monitor displays a main screen which is working and the sub monitor displays pop-up ads or a program update notification or plays and displays Youtube or displays messengers or SNS, the main monitor displays a documentation tool, a development tool, or an image editing tool and the sub monitor disposes a ribbon menu of the corresponding tool to be displayed, or the main monitor displays multiple video conference images, and the sub monitor displays an auxiliary screen for sub tasks.

6. The laptop having dual monitors that are arranged vertically according to claim 2, wherein UIs which are modified and changed to be provided by a program providers are divided into a main screen and an auxiliary screen to be displayed on the main monitor and the sub monitor respectively, and the main monitor displays a main screen which is working and the sub monitor displays a list of programs which are being activated or recently used files or recently used programs.

7. The laptop having dual monitors that are arranged vertically according to claim 6, wherein the main monitor displays a Youtube video in a Youtube full screen mode and the sub monitor displays a list of Youtube videos to be played, the main monitor displays a streamer image and the sub monitor displays a chatting screen, the main monitor displays a slideshow screen of a presentation program and the sub monitor displays a slide thumbnail screen or an editing screen of the presentation program, or the main monitor displays a search result list page of web shopping homepages and the sub monitor displays product detail information pages for a product selected from the search result list.

8. The laptop having dual monitors that are arranged vertically according to claim 1, wherein a third hinge unit which is rotatably hinged left and right at 90° to 180° is formed on a lower end of the first hinge unit formed to fold the main monitor in a vertical direction of the main body to be fixedly formed at one side of the main body.

* * * * *